United States Patent [19]
Hastings

[11] 4,102,632
[45] Jul. 25, 1978

[54] MODULAR HEAT RECUPERATOR

[76] Inventor: Phillip Hastings, 1819 S. 1100 East, Salt Lake City, Utah 84105

[21] Appl. No.: 743,826

[22] Filed: Nov. 22, 1976

[51] Int. Cl.² .............................................. F28F 1/10
[52] U.S. Cl. ..................................... 432/3; 432/179; 432/223; 165/164; 165/165; 285/137 R; 138/38; 136/116
[58] Field of Search ........... 165/76, 164, 165, DIG. 2; 432/3, 223, 255, 219, 177, 179, 72; 110/56; 285/137 R; 138/38, 115, 116

[56] References Cited
U.S. PATENT DOCUMENTS

| 874,673 | 12/1907 | Green | 138/38 |
| 1,360,457 | 11/1920 | Sklosky | 432/179 |
| 1,673,918 | 6/1928 | Mauran | 165/165 |
| 1,770,208 | 7/1930 | Kemnal | 138/38 |
| 1,771,160 | 7/1930 | Chapman | 165/75 |
| 2,070,427 | 2/1937 | Faunce | 165/76 |
| 2,107,933 | 2/1938 | Crockett et al. | 138/38 |
| 2,326,716 | 8/1943 | Wood | 138/116 |
| 2,687,876 | 8/1954 | Hytte | 165/164 |
| 3,829,285 | 8/1974 | Beck | 432/223 |
| 3,872,780 | 3/1975 | Zanias | 98/60 |
| 3,960,393 | 6/1976 | Hosokawa et al. | 285/137 R |
| 4,015,932 | 4/1977 | Zurawski | 432/179 |
| 4,029,465 | 6/1977 | LeHaye et al. | 432/179 |
| 4,060,380 | 11/1977 | Bolt | 432/179 |

OTHER PUBLICATIONS
Industrial Furnaces by W. Trink, 4th Edition, vol. 1, pp. 374-395.

Primary Examiner—John J. Camby
Assistant Examiner—Henry C. Yuen
Attorney, Agent, or Firm—H. Ross Workman; J. Winslow Young

[57] ABSTRACT

A heat recuperator for recovering thermal energy from exhaust gases emitted by a high temperature combustion furnace. The thermal energy is absorbed by an incoming stream of air. The heated air may be diverted to auxiliary heat-requiring systems and/or mixed with fuel and used in the combustion process thereby providing significant savings in energy consumption. The heat recuperator is constructed as a countercurrent-flow heat exchanger, preferentially, from a plurality of interchangeable modular elements. Each modular element is longitudinally separated into at least two flow channels in heat exchange relationship. One flow channel is used for hot exhaust gases while the incoming air is forced countercurrently through another flow channel to thereby absorb thermal energy from the hot exhaust gases. Modular construction readily accommodates (1) assembly of various size heat recuperators from standardized modular elements, (2) replacement of damaged modular elements without replacing the entire heat recuperator, (3) ease of (a) handling, (b) disassembly, and (c) cleaning and (4) selectively fabricating different modular elements from different materials of construction to specifically meet and withstand the different environmental conditions to be encountered by the various parts of the heat recuperator so constructed.

2 Claims, 8 Drawing Figures

MODULAR HEAT RECUPERATOR

BACKGROUND

1. Field of the Invention

This invention relates to heat recuperators for high temperature combustion furnaces.

2. The Prior Art

High temperature combustion furnace operations particularly those operating above about 1000° C consume enormous quantities of energy. Such high temperature furnace operations include, for example, copper smelters, glass furnaces, steel furnaces, and the like. Customarily, the combustion furnace is constructed as an enclosed, heat-resistant vessel containing a pool of material being heated. A combustion flame is directed into the enclosure over the top of the material being heated. Customarily, only about 15–25 percent of the thermal energy of the flame is absorbed by the material, the remaining 75–85 percent of the thermal energy is lost. About 30 percent of the thermal energy lost is lost through the furnace walls, roof, floor and exhaust duct work and is carried out with the exhaust. This thermal energy loss represents a significant quantity of energy that must be supplied by consumption of additional fuel unless some form of energy recuperation is practiced.

The portion of thermal energy discharged to the atmosphere as exhaust represents a significant quantity of potentially recoverable thermal energy. However, as a result of the very high temperatures and, occasionally, the corrosive environment encountered in the exhaust gases, very few structural materials can successfully withstand prolonged exposure to the hot exhaust gases.

One conventional heat recovery technique involves directing the hot exhaust gases through a chamber containing a grid work of refractory bricks known as a checker system. The checker system is formed as two, separate systems so that hot exhaust gases can be diverted through the bricks in one system until they are heated to an optimum temperature. The exhaust stream is then switched into the second system while incoming air is drawn through the first system and heated by absorbing thermal energy from the heated bricks in the first system. The exhaust and airstreams are alternately switched between the two checker systems at set intervals of about 20–30 minutes. The result is that the incoming airstream to the combustion furnace does not have a constant temperature but a cyclically varying temperature. This results in loss of furnace efficiency and difficulty in accurately controlling the thermal energy input to the furnace and also results in loss of efficiency because of the difficulty in controlling the air/fuel ratios.

Additionally, checker systems occupy a large space and involve relatively elaborate duct work and valving systems thereby requiring relatively high initial construction cost and ongoing maintenance costs.

Attempts to avoid the problem associated with the checker system of heat recuperation has led to the use of lower temperature heat recuperation systems. For example, a typical glass furnace operates at a relatively high temperature (approximately 1000°–1650° C) which means that the exhaust gases therefrom would be far in excess of the maximum temperature capabilities of most metals. Accordingly, it is conventional to dilute the hot exhaust with outside air and, thereby, lower the exhaust temperature so that a standard metal recuperator can be used. However, dilution causes a tremendous loss in the enthalpy of the exhaust stream and, consequently, a tremendous loss in the recuperator efficiency.

Furthermore, many exhaust systems carry fumes that are extremely corrosive to most metals. It has also been found that fumes carried over with the exhaust stream tend to condense on the cooler recuperator surfaces. At high temperatures, the condensate tends to be a corrosive fluid while at lower temperatures the fumes crystallize as a dust having a fuzzy, crystalline characteristic which tends to form an insulative layer in the exhaust duct work. This layer must be removed periodically so as to enhance heat transfer and lower the resistance to flow of the hot exhaust gases.

Cleaning of large heat recuperators is difficult, time consuming and, therefore, expensive unless the recuperator may be readily disassembled and reassembled from elements which are easily handled and cleaned.

An energy balance between the hot exhaust gases and the incoming airstream shows that for maximum efficiency a greater quantity of air can be heated than is used for supporting combustion. Accordingly, it would be advantageous to divert a portion of the heated air as a heat source for a lower temperature process such as an annealing furnace or the like. However, the cyclically varying temperatures resulting from an airstream passed through a conventional checker system would render the heated airstream unfit for use in any annealing furnace requiring a reasonably controlled temperature.

It is also desirable to divert a portion of the heated air as an auxiliary heated airstream for use in structure heating as comfort conditioning. However, when used for comfort conditioning, great care must be exercised to insure that combustion products are specifically precluded from entering the comfort conditioning system. Accordingly, it is usually conventional to make no attempt to use any of the recovered heat for comfort conditioning.

It would, therefore, be a significant advancement in the art to provide a high temperature heat recuperator apparatus and method whereby the heat recuperator is readily fabricated from a plurality of standardized, interchangeable, modular elements. It would also be an advancement in the art to provide a recuperator wherein the modular elements in contact with the most destructive portion of the exhaust gases are fabricated from a highly refractory ceramic material while the remaining portion of the recuperator modules may be, selectively, inexpensively fabricated from conventional metallic materials. Another advancement in the art would be to provide a heat recuperator wherein the incoming airstream is pressurized so as to inhibit the infiltration of exhaust gases into the airstream and thereby accommodate diverting at least a portion of the airstream for use in auxiliary heat systems and, more particularly, for use in comfort conditioning. Such an invention is disclosed herein.

BRIEF SUMMARY AND OBJECTS OF THE INVENTION

The present invention is a countercurrent-flow heat recuperator apparatus which is, preferentially, constructed from a plurality of interchangeable, modular elements. Modular element construction readily accommodates handling, replacement of broken elements, disassembly and cleaning. A heat recuperator assembled from modular elements also readily adapts to dimensional variations resulting from temperature fluctuations within the recuperator. The modules in the high temperature portion of the recuperator may also be preferentially, fabricated from a highly refractory ceramic material whereas the modules in the low temperature portion may be more inexpensively fabricated from conventional metallic materials. Preferably, the materials from which the modules are made will change from highly refractory (high temperature) ceramic, to lower refractory (lower temperature) ceramic, progressively as the modules are more removed from the heat source. Modular construction, whether ceramic or metallic, readily accommodates the interchangeability of the modular elements and the assembly of various heat recuperator designs according to the requirements of the environment to be encountered. Thus, if a module becomes damaged or obstructed, it can be replaced without replacement of the entire assembly.

It is, therefore, a primary object of this invention to provide improvements in heat recuperators for high temperature combustion furnaces.

Another object of this invention is to provide an improved method for recovering thermal energy from the exhaust stream of a high temperature combustion furnace.

Another object of this invention is to provide standardized modular recuperator elements which may be interconnected to provide a heat recuperator having the desired capabilities.

Another object of this invention is to provide means for interlocking the modular elements so as to assure alignment of the flow channels therethrough.

These and other objects and features of the present invention will become more fully apparent from the following description and appended claims taken in conjunction with the accompanying drawing.

DETAILED DESCRIPTION OF THE PREFERRED EMBODIMENTS

Figure 1:
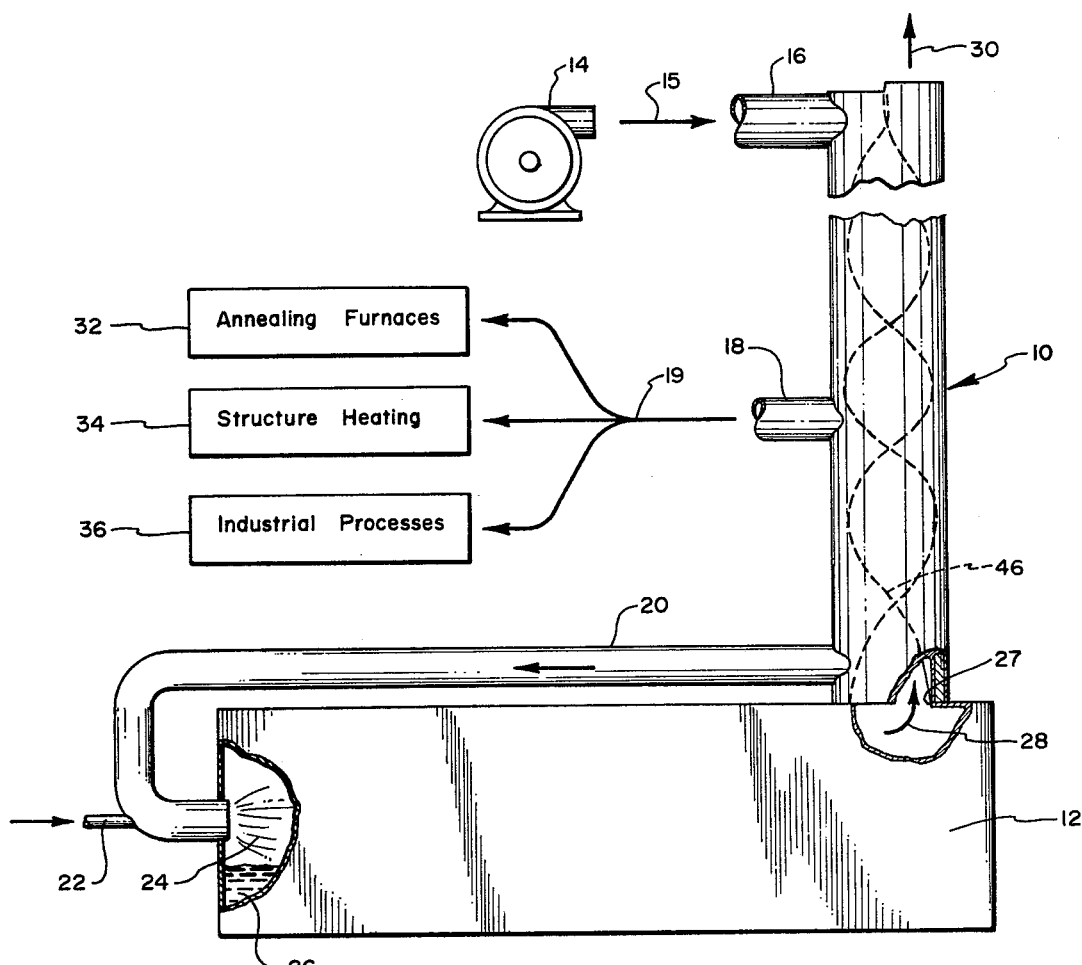
FIG. 1 is a schematic side elevation of a first preferred embodiment of the heat recuperator of this invention shown in the environment of a combustion furnace with portions broken away to reveal internal features.

The invention is best understood by reference to the drawing wherein like parts are designated with like numerals throughout.

Referring now more particularly to FIG. 1, a first preferred embodiment of the heat recuperator of this invention is shown generally at 10 as a countercurrent-flow heat exchanger and supported in a vertical orientation above an exhaust outlet 27 of a high temperature combustion furnace 12. High temperature combustion furnace 12 may be any suitable furnace including, for example, a glass furnace having a pool of molten glass 26 in the base thereof and over which a flame 24 is directed. A resulting high temperature exhaust stream 28 passes upwardly into heat recuperator 10 and is discharged therefrom as a cooled exhaust stream 30. Heat recuperator 10 is separated longitudinally into at least two flow channels 60 and 62 (FIGS. 2 and 4) in this first preferred embodiment by a spirally formed septum 46 shown in broken lines. Septum 46 is also more clearly shown in FIGS. 2 and 4. A first flow channel 60 (FIGS. 2 and 4) serves as a first path for the hot exhaust gases while the second flow channel 62 (FIGS. 2 and 4) serves as a second path for an incoming airstream 15 with heat exchange occurring across septum 46. The spiral configuration provided by the twist in septum 46 is believed to impart sufficient turbulence to hot exhaust stream 28 for improved heat transfer across septum 46. The spiral configuration also increases the heat transfer area over the length of the module. Clearly, other countercurrent flow systems (not shown) could readily be adapted to the heat recuperator 10 of this invention including, for example, concentric ducts, straight, or semi-cylindrical channels.

Airstream 15 is introduced into heat recuperator 10 by a blower 14 which provides the necessary volume and pressure to airstream 15 to substantially preclude infiltration of combustion products from hot exhaust stream 28 into airstream 15. If desired, airstream 15 may be supplemented with oxygen or other combustion-supporting gas. Accordingly, a portion of the heated airstream 15 may be readily diverted through an auxiliary air outlet 18 to be suitably used for a number of lower temperature operations including, for example, an annealing furnace 32, structure heating 34 and/or other industrial processes 36.

The remaining heated air of airstream 15 is directed through a duct 20 as a stream of high-temperature combustion air. This high-temperature combustion air is mixed with fuel introduced through a fuel inlet 22 and ignited to provide flame 24. Preheating of the combustion air to flame 24 provides substantial economies for the operation of furnace 12 since a portion of the thermal energy derived from flame 24 is not wasted in preheating the incoming airstream 15.

Figure 2:
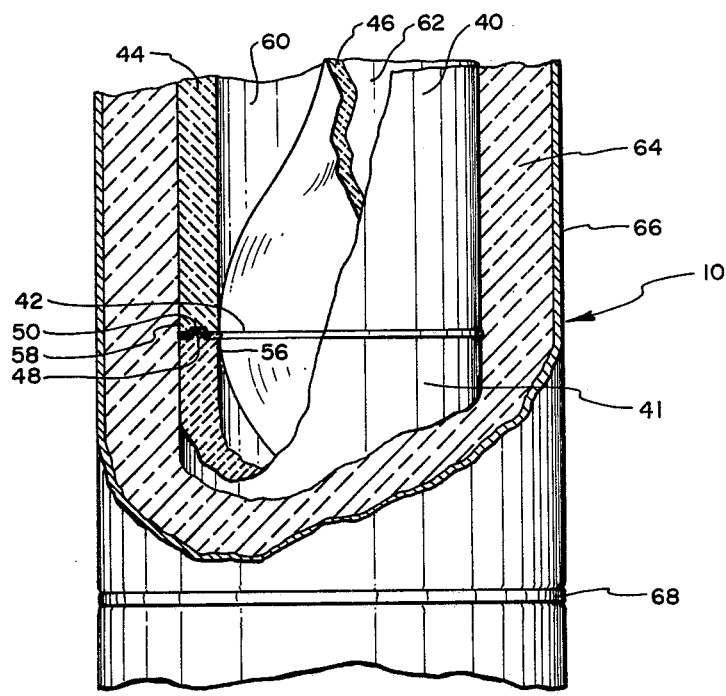
FIG. 2 is an enlarged elevational view of a fragment of the heat recuperator of FIG. 1 with portions broken away to reveal internal features.

Referring now more particularly to FIG. 2, a section of heat recuperator 10 is shown with portions broken away to reveal internal structure. In particular, heat recuperator 10 is fabricated from a plurality of corresponding recuperator modules 40 and 41 each of which provides at least two separated flow channels 60 and 62 in alignment therethrough and in heat exchange relationship across dividing septum 46. The structure of recuperator module 40 will be discussed more fully hereinafter with respect to FIG. 4.

Recuperator modules 40 and 41 are placed in axial alignment by means of a tongue and groove relationship between corresponding male and female ends. in particular, a female end 58 of recuperator module 40 includes an annular groove 50 which mates with the male end 56 of the corresponding recuperator module 41 having an annular ridge 48 formed thereon. Recuperator module 40 also has a similar male end 56 (FIG. 4) but broken away in FIG. 2 for simplicity in illustration. A similar ridge 52 and mating groove 54 system (FIG. 4) are also contained in each end of septum 46 to assure alignment of the septa 46 when a plurality of recuperator modules 40 and 41 are assembled in axial alignment.

Figure 5:
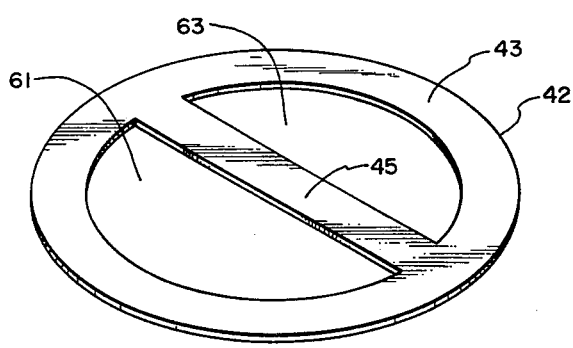
FIG. 5 is a perspective view of a gasket for placement between the modular elements of FIG. 4.

A gasket 42 (shown more fully in FIG. 5) is inserted between recuperator modules 40 and 41. Gasket 42 (FIG. 5) is formed as an annular ring 43 having a dividing strip 45, both of which dimensionally correspond to the end of shell 44 and septum 46, respectively, to form a seal between corresponding recuperator modules 40 and 41. Cut out segments 61 and 63 (FIG. 5) provide continuity to flow channels 60 and 62, respectively. Gasket 42 is desirably fabricated from a ceramic wool felt material capable of withstanding the high temperatures encountered in the operation of recuperator 10. The ceramic wool felt material of gasket 42 provides a seal between recuperator modules 40 and 41 and also imparts cushioning effect to compensate for stresses which may otherwise fracture the recuperator modules 40 and 41 when temperature fluctuations cause dimensional variations in heat recuperator 10.

The assembled recuperator 10 is surrounded by a jacket of insulation 64 of suitable high temperature insulative material such as KAOWOOL the trademark for a mineral-wool insulation manufactured by BABCOCK-WILCOX, Augusta, Georgia. Insulation 64 is enveloped in a suitable protective covering 66 with the insulation 64 and covering 66 being secured around recuperator 10 by a plurality of encircling bands similar to band 68.

Figure 4:
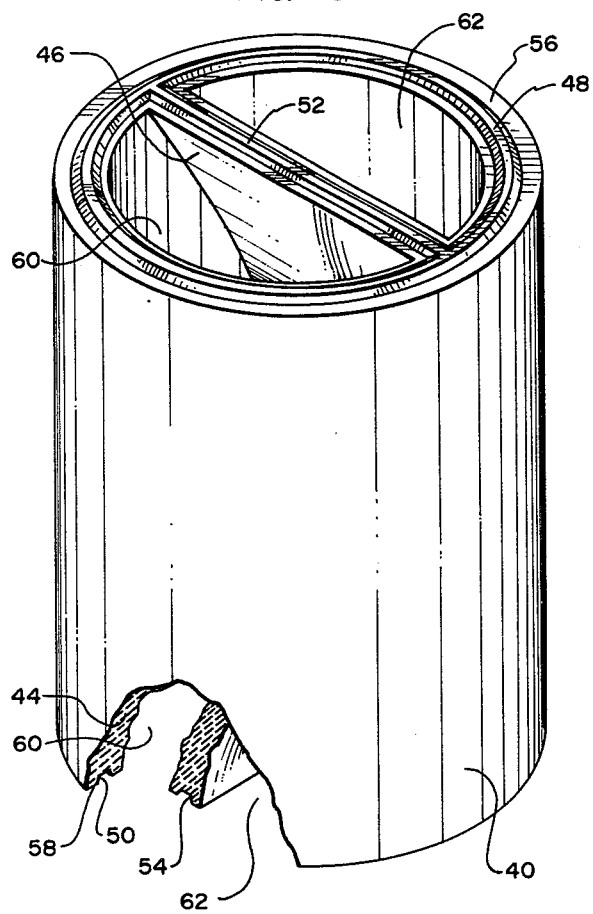
FIG. 4 is a perspective view of one presently preferred embodiment for the modular heat recuperator element of this invention with portions broken away to reveal internal features.

Referring now more particularly to FIG. 4, heat recuperator module 40 is more clearly illustrated particularly with respect to the flow channels 60 and 62 which are separated by the longitudinal septum 46. In this presently preferred embodiment of recuperator module 40, septum 46 twists along the axis of recuperator module 40 through 90° from the male end 56 to the female end 58. However, septum 46 may be twisted through any number of degrees between the male end 56 and the female end 58. In this event, the prime consideration is that the degree of twist of septum 46 be standardized between recuperator modules 40 and 41 (FIG. 2) so that the respective male and female ends of septum 46 mate with corresponding septum 46 to provide continuity through flow channels 60 and 62. Clearly, septum 46 could be planar along the axis of recuperator module 40 thereby dividing recuperator module into two semi-cylindrical flow channels.

Figure 3:
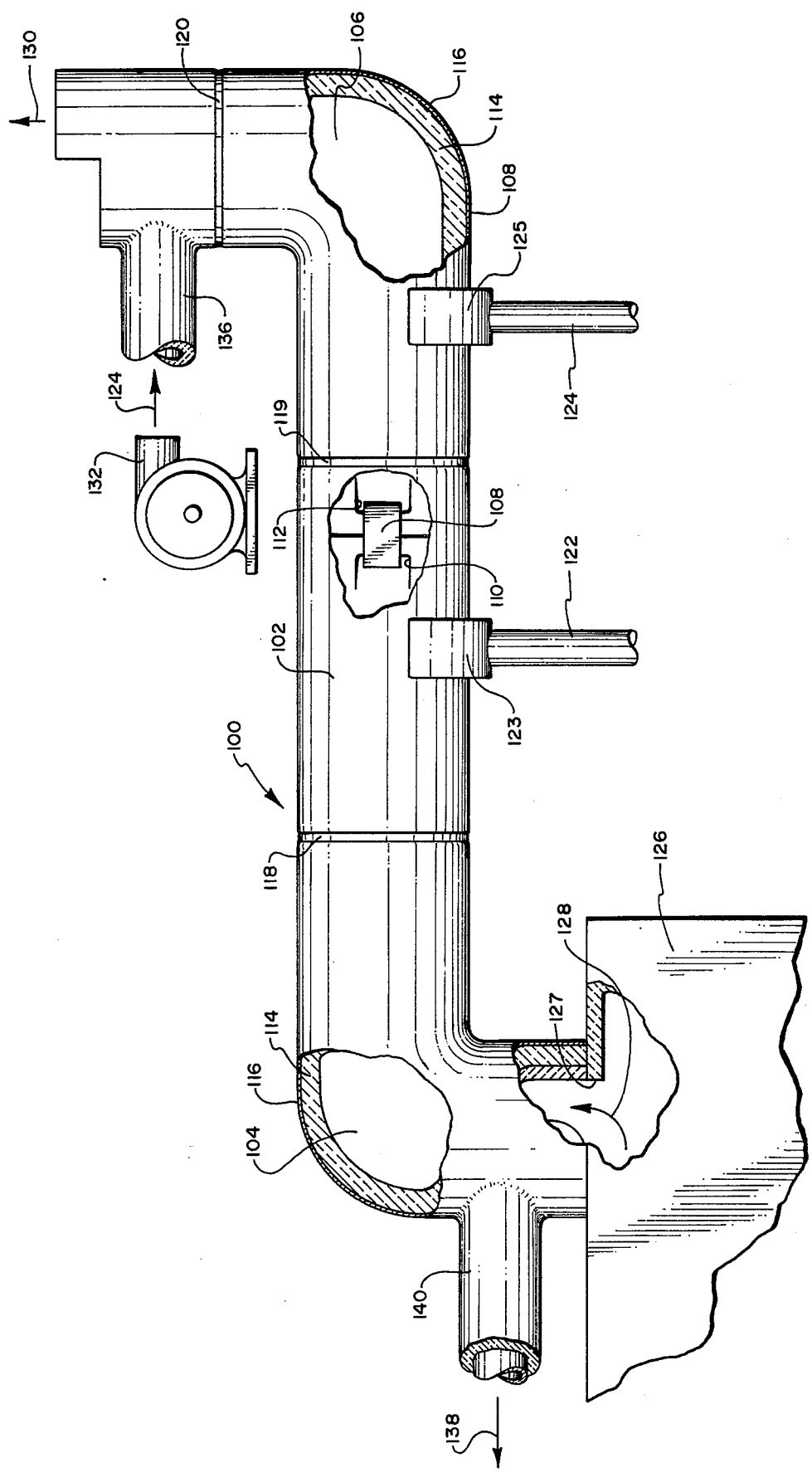
FIG. 3 is a side elevation of a second preferred embodiment of the heat recuperator of this invention in a horizontal orientation with portions broken away to reveal internal features.

Referring now to FIG. 3, a second preferred embodiment for a heat recuperator apparatus of this invention is shown generally at 100 and includes a heat recuperator 102 superimposed over an exhaust outlet 127 of a high temperature combustion furnace 126. In this particular embodiment for recuperator 102, a plurality of modular recuperator elements such as recuperator element 40 (FIG. 4) or recuperator element 70 (FIG. 6) are placed in axial alignment with respective flow channels aligned and along a generally horizontal axis.

Elbow modules 104 and 106 at each end of heat recuperator 102 are adapted to receive an exhaust stream 128 and to discharge the cooled exhaust 130, respectively. The assembled modules of heat recuperator 102 are held together in one presently preferred embodiment of the invention by a transverse bracket 108 having hooks at each end which nest within notches 110 and 112 of the modules. Preferentially, bracket 108 is fabricated from a ceramic material having a coefficient of thermal expansion comparable to the material of construction of the recuperator modules in heat recuperator 102 so as to provide a corresponding expansion and contraction during thermal changes in the heat recuperator 102.

The assembled heat recuperator 102 is wrapped in an insulative blanket 114 over which a protective layer 116 is placed with the entire insulative assembly being held in position by a plurality of circumferential bands 118-120.

Heat recuperator 102 is supported in its horizontal position by a plurality of conventional means such as saddles 123 and 125 mounted on the ends of stanchions 122 and 124, respectively. Clearly, any other suitable, conventional means could be used to support the horizontal portion of heat recuperator 102 and may include a horizontal track or the like.

An airstream 124 is blown through an inlet 136 by means of a blower 132 and passed in countercurrent heat exchange relationship with the hot exhaust 128 so as to provide a heated airstream 138 from an outlet 140. The heated air 138 may, thereafter, be used for supporting combustion in combustion furnace 126 and/or auxiliary heating purposes as set forth hereinabove with respect to the first preferred embodiment shown in FIG. 1.

Figure 8:
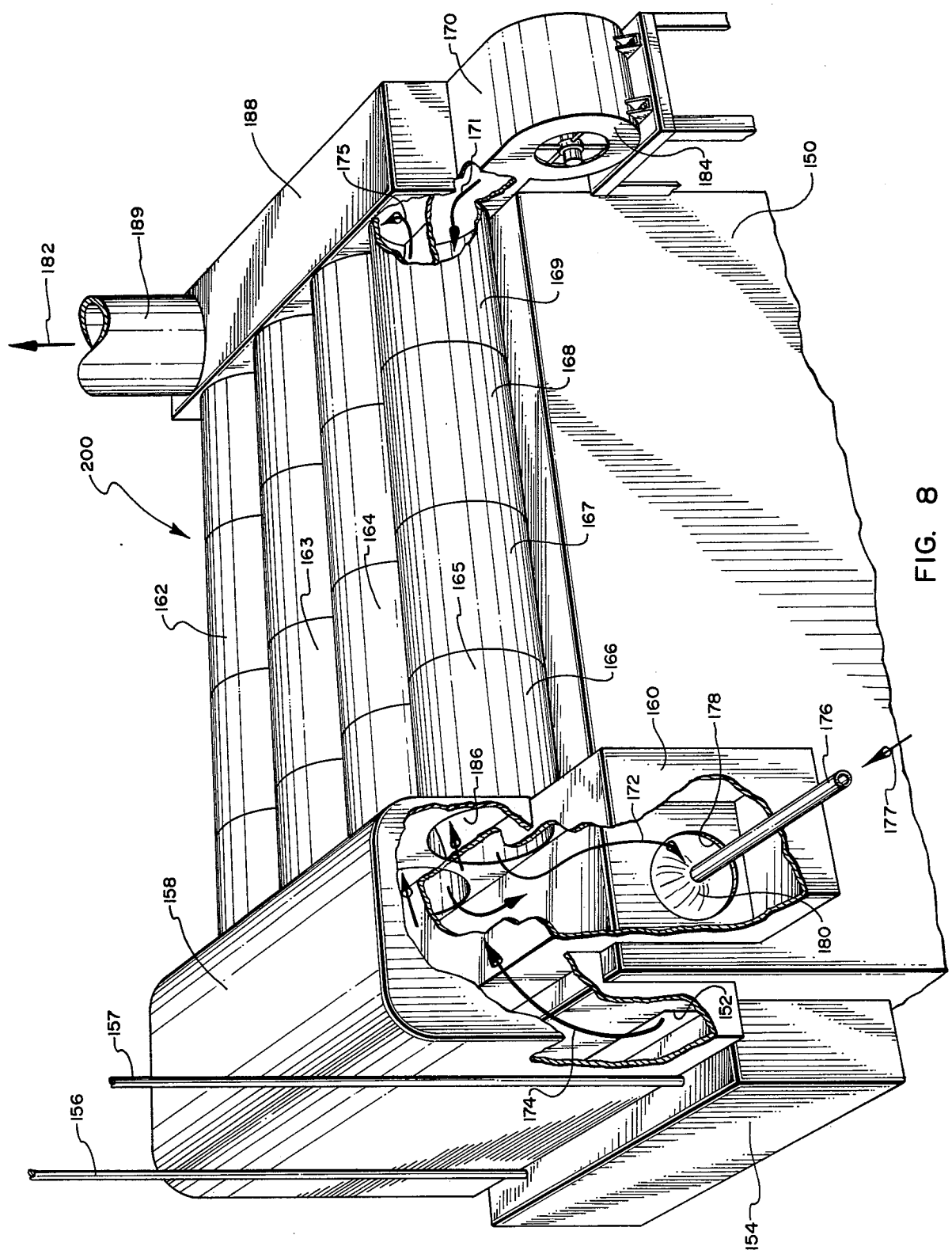
FIG. 8 is a perspective view of a third preferred embodiment of the heat recuperator of this invention with portions broken away to reveal internal features.

Referring now more particularly to FIG. 8, a third preferred embodiment for the heat recuperator development of this invention is shown generally at 200. Heat recuperator 200 is assembled from a plurality of heat recuperator assemblies 162-165, each of which are substantially similar to heat recuperator 10 (FIGS. 1 and 2) and heat recuperator 100 (FIG. 3). Each of heat recuperator assemblies 162-165 are assembled from a plurality of heat recuperator modules and shown herein as modules 166-169 of heat recuperator assembly 165. Clearly, of course, each of heat recuperator assemblies 162-165 could be fabricated with a single modular element such as recuperator module 40 (FIG. 4) or recuperator module 70 (FIG. 6), depending upon the particular requirements of recuperator 200.

Heat recuperator 200 in this third preferred embodiment is particularly adapted to be assembled on top of the enclosure forming a high-temperature combustion furnace 150. Combustion furnace 150 is schematically illustrated as a conventional glass furnace for a glassblowing operation and includes an opening 152 which is substantially occluded by a door 154. Door 154 is suspended by rods 156 and 157 from an overhead trolley (not shown) which allows lateral movement of door 154 away from its occluding position in front of opening 152.

The upper portion of opening 152 remains unobstructed by door 154 and, therefore, serves as a vent for hot exhaust gases 174. A hood 158 collects the hot exhaust gases 174 emerging from opening 152 and distributes the same to the appropriate flow channels of heat recuperator assemblies 162-165. In particular, hot exhaust gases 174 are deflected by hood 158 into exhaust flow channels of recuperator assemblies 162–165 where they pass in heat-exchange relationship with the incoming airstream 172. The spent exhaust gases 175 are gathered in a plenum 188 and are, thereafter, discharged through conventional exhaust duct work 189 as a discharge stream 182.

Incoming air is directed countercurrently through recuperator assemblies 162–165 as a forced airstream 171 by a blower 184. Blower 184 forces airstream 171 into a header 170 to distribute airstream 171 to the recuperator assemblies 162–165. Blower 184, advantageously, provides sufficient over-pressure in the airstream 171 to substantially inhibit leakage of exhaust 174 into the heated airstream 172. A septum 186 separates incoming airstream 171 from exhaust gases 174 and provides a partition through which heat exchange occurs. Assembly of heat recuperator 200 on the top of furnace 150 accommodates absorption of thermal energy emitted by furnace 150 thereby increasing the amount of thermal energy absorbed by airstream 172.

The heated airstream 172 exiting from recuperator assemblies 162–165 is gathered by a plenum chamber 160 and directed to an inlet 178 into furnace 150. Fuel 177 from a fuel inlet 176 is mixed with airstream 172 and ignited to form a combustion flame 180.

Importantly, each of recuperator assemblies 162 and 165 are assembled from a plurality of recuperator modules 166–169 and thereby readily accommodate (1) assembly of a plurality of various size recuperator assemblies 162–165 and, therefore, heat recuperators 200; (2) replacement of individual recuperator modules 166–169 are required due to wear, breakage, and the like; and (3) disassembly for cleaning and reassembly for additional use. Furthermore, standardization between recuperator modules 166–169 readily accommodates interchangeability as between recuperator modules 166–169 particularly by reason of the standardization as between length, diameter, and the location and degree of twist of septum 186 in each of recuperator modules 166–169 as set forth hereinbefore with respect to the recuperator modules described in FIGS. 4 and 6.

The parallel configuration of heat recuperator 200 readily adapts itself to handling a large volume of exhaust gases 174 by reason of the parallel flow channels provided by heat recuperator assemblies 162–165. Correspondingly, a large volume for airstream 172 may also be readily accommodated, where desired, for various heating purposes. This same parallel configuration may also be adapted in heat recuperator 10 (FIG. 1) and heat recuperator 100 (FIG. 3).

Heat recuperator 200 may be, selectively, covered with an insulative blanket (not shown) such as insulative blanket 64 (FIG. 2) or blanket 144 (FIG. 3). The partially cooled exhaust gases 182 may be discharged to the atmosphere or, preferably, used as a further heat source by being directed through a second recuperator such as recuperator 10 (FIG. 10) or recuperator 100 (FIG. 3). Additionally, heated air 172 may be used directly in the combustion process as set forth hereinbefore or a portion thereof may be diverted for auxiliary heating purposes as set forth hereinbefore with respect to FIG. 1. As a further feature, heat recuperator 200 may also be used to provide initial warm-up heat for an adjacent combustion furnace (not shown) particularly since the volume of heated airstream 172 could desirably be substantially in excess of that required to support combustion of fuel 177.

Figure 6:
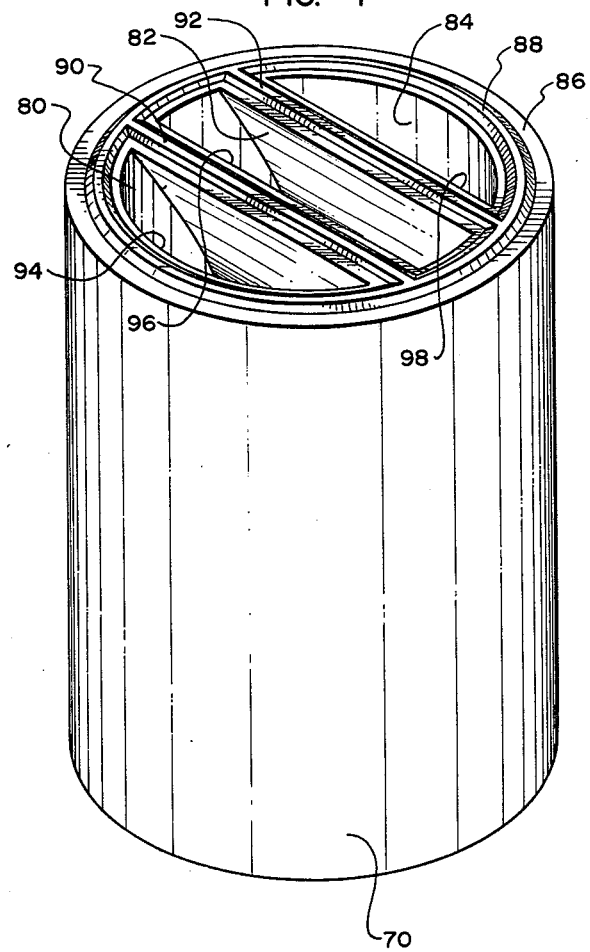
FIG. 6 is a perspective view of a second preferred embodiment of a modular element for the heat recuperator of this invention.

Referring now more particularly to FIG. 6, a second preferred recuperator module 70 is shown and is segregated into three flow channels, flow channels 94, 96 and 98. Flow channels 94 and 96 are separated by a first septum, septum 80, while flow channels 96 and 98 are separated by a second septum, septum 82. Septa 80 and 82, preferentially, form parallel, spiral flow channels along the axis of recuperator module 70 thereby separating the interior of shell 84 into three spiral, parallel flow channels 94, 96 and 98. Clearly, flow channels 94, 96 and 98 could also be formed as straight channels although the improved heat transfer obtained by spiral channels is preferred.

Flow channels 94, 96 and 98 may be used in any suitable combination for the various gaseous streams including, for example, hot exhaust gas stream 28 (FIG. 1), hot exhaust gas stream 128 (FIG. 3), hot exhaust gas stream 174 (FIG. 8), incoming airstream 15 and auxiliary heated airstream 19 (FIG. 1), incoming airstream 124 and auxiliary heated airstream 138 (FIG. 3), and incoming airstream 171 (FIG. 8). Desirably, flow channel 96 could be used for the particular hot exhaust gas stream while each of flow channels 94 and 98 could be used for an incoming airstream and auxiliary heated air, respectively. Having the heat-receiving airstreams on the outside periphery of recuperator module 70 would also increase the opportunity for absorption of thermal energy from surrounding ambient particularly when configured on top of a furnace similar to heat recuperator 200 on furnace 150 (FIG. 8).

The upper end of recuperator module 70 is formed as a male connector 86 having an annular ridge 88 adapted to mate with a corresponding groove (not shown) at the opposite end of a corresponding recuperator module 70. Each of septa 80 and 82 include ridges 90 and 92, respectively, which are also adapted to be received in corresponding grooves (not shown) in the opposite ends of the respective septa of a corresponding recuperator module 70.

Figure 7:
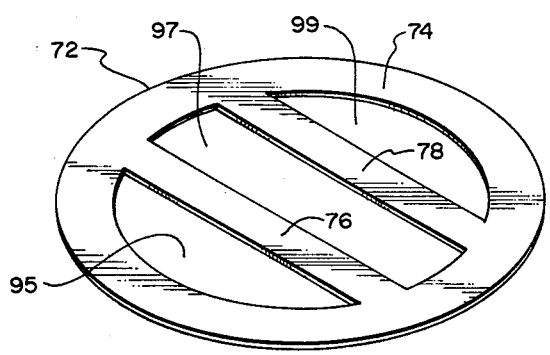
FIG. 7 is a perspective view of a gasket for placement between the modular elements illustrated in FIG. 6.

Referring now more particularly to FIG. 7, a gasket 72 is illustrated and is dimensionally formed to be placed between abutting recuperator module 70 (FIG. 6). In particular, gasket 72 includes an annular ring 74 and transverse bands 76 and 78. Ring 74 is dimensionally configured to be superimposed over the male end 86 of recuperator module 70 (FIG. 6) while bands 76 and 78 are superimposed over the ends of septa 80 and 82 (FIG. 6), respectively. Accordingly, openings 95, 97 and 99 in gasket 72 correspond with flow channels 94, 96 and 98 (FIG. 6), respectively.

The heat recuperator embodiments of this invention, advantageously, accommodate diverting at least a portion of the heated airstream for use as an auxiliary heated air source. This is particularly useful in annealing furnaces where objects are held under a controlled temperature until suitably annealed to relieve intenal stresses developed during manufacture. The auxiliary heated airstream has the advantages of being relatively controllable with respect to temperature and substantially free of contaminants carried over as fume with the exhaust stream. Additionally, where feasible, hot exhaust gas streams from more than one high temperature combustion furnace may be utilized for the purpose of suitably heating and annealing furnace through the use of the heat recuperators of this invention.

Importantly, the heat recuperator elements of this invention in proximity to the high temperature combustion furnace are fabricated from a high-refractory ceramic material of construction having a capability of withstanding high temperatures and destructive environment of the furnace. Such materials of construction include, for example, alumina ($Al_2O_3$), silicon carbide (SiC), silicon nitride ($Si_3N_4$), and the like. Each of these materials of construction have the capability of being formed by casting or extrusion and, more importantly, are very resistant to extremely high temperatures and corrosive environments that are frequently encountered in high temperature combustion furnace exhaust streams.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A heat recuperator system in combination with a high temperature combustion furnace for heating combustion air to the furnace comprising:

a plurality of recuperator modules adapted to be interconnected together to form a heat recuperator, each recuperator module having as an integral part thereof at least one septum for axially dividing the interior of the module so as to form at least first and second flow channels in heat exchange relationship, the recuperator modules each having means for aligning the ends of the septum with the ends of the septa of adjacent modules so as to maintain said first and second channels separated after the modules have been interconnected;

a plurality of gasket means interposed between the modules to inhibit leakage from the flow channels;

means for directing exhaust gases from the combustion furnace into the first flow channel;

means for forcing air into the second flow channel counter-directionally to the flow of exhaust gases in the first flow channel;

means for combining a portion of the air from the second flow channel with a fuel, the air serving as combustion air for the fuel in the combustion furnace;

means for placing the interconnected recuperator modules in axial alignment to compensate for dimensional variations in the heat recuperator caused by temperature fluctuations in the heat recuperator;

means for supporting the interconnected recuperator modules in a vertical orientation thereby placing the interconnected recuperator modules under axial compression from gravitational forces;

means for diverting a second portion of air from the second flow channel after it has been in heat exchange relationship with the exhaust gases in the first flow channel; and means for supplementing the air in the second flow channel with the combustion-supporting gas.

2. A method for heating combustion air for a combustion furnace comprising the steps of:

assembling the heat recuperator from a plurality of modular recuperator elements, at least one modular recuperator element comprising a hollow, right cylindrical shell with at least one septum integral to the shell and separating the hollow shell into at least a first and a second flow channel, the septum providing heat exchange between the first and second flow channels, said modular element further having means for aligning said septum with respect to septa of adjacent modules so as to maintain said first and second flow channels separated one from the other, said assembling step further comprising the steps of:

modifying at least one of the modular elements with an outlet for the second flow channel through the shell to accommodate conducting away a portion of the heated air as an auxiliary heated air stream;

placing a first member of the modular recuperator elements formed of high temperature material nearest to the exhaust outlet while joining a second member of modular recuperator elements formed of lower temperature material to the high temperature modules so that the hottest exhaust gases first contact the modular recuperator elements formed of high temperature material; and supporting the aligned modular recuperator elements in axial alignment by stacking the modular recuperator elements vertically so as to (1) compensate for dimensional changes caused by temperature fluctuations and (2) so as to place the aligned modular recuperator elements under axial compression by gravitational forces;

fabricating the heat recuperator by placing the first and second flow channels of the modular recuperator elements in alignment thereby providing at least first and second flow channels through the recuperator;

connecting the first flow channel of the recuperator to an exhaust outlet of a combustion furnace thereby providing fluid communication for a hot exhaust gas stream through the heat recuperator;

forcing air countercurrently through the heat recuperator through the second flow channel in heat exchange relationship with the hot exhaust gas stream thereby heating the air;

pressurizing the air stream to a greater pressure than the hot exhaust gas stream thereby inhibiting exhaust gases from entering the air stream; and mixing a fuel with the heated air while directing the fuel/air mixture into a combustion zone of the combustion furnace and igniting the fuel/air mixture thereby providing heat to the combustion furnace and the resultant hot exhaust gas stream.

* * * * *